(12) United States Patent
Steiner et al.

(10) Patent No.: US 10,826,407 B2
(45) Date of Patent: *Nov. 3, 2020

(54) LOAD CONTROL DEVICE FOR CONTROLLING A DRIVER FOR A LIGHTING LOAD

(71) Applicant: Lutron Technology Company LLC, Coopersburg, PA (US)

(72) Inventors: James P. Steiner, Royersford, PA (US); Daniel G. Cooper, Coopersburg, PA (US); Ryan S. Bedell, West Palm Beach, FL (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,106

(22) Filed: Oct. 8, 2019

(65) Prior Publication Data

US 2020/0036296 A1 Jan. 30, 2020

Related U.S. Application Data

(60) Continuation of application No. 16/118,406, filed on Aug. 30, 2018, now Pat. No. 10,461,661, which is a
(Continued)

(51) Int. Cl.
*H02M 7/217* (2006.01)
*H05B 45/14* (2020.01)
(Continued)

(52) U.S. Cl.
CPC ............ *H02M 7/217* (2013.01); *H05B 45/14* (2020.01); *H05B 45/50* (2020.01); *H05B 47/10* (2020.01)

(58) Field of Classification Search
None
See application file for complete search history.

(56) References Cited

U.S. PATENT DOCUMENTS 5,248,919 A 9/1993 Hanna et al.
6,046,550 A * 4/2000 Ference ............... H05B 39/086
315/291

(Continued)

*Primary Examiner* — Seokjin Kim
(74) *Attorney, Agent, or Firm* — Condo Roccia Koptiw LLP (57) ABSTRACT

A load control device is configured to generate a control signal having a desired magnitude for controlling a load regulation device adapted to control the power delivered to an electrical load. The load control device may comprise a control terminal arranged to provide the control signal to the load regulation device, a communication circuit for generating the control signal, and a control circuit configured to generate an output signal that is provided to the communication circuit. The communication circuit may be characterized by non-linear operation. The control circuit may adjust the magnitude of the output signal in response to the difference between the magnitude of the control signal and the desired magnitude to adjust the magnitude of the control signal towards the desired magnitude. The control circuit may also be configured to determine if an incompatible load regulation device is coupled to the load control device.

20 Claims, 5 Drawing Sheets

Related U.S. Application Data division of application No. 14/813,006, filed on Jul. 29, 2015, now Pat. No. 10,236,789.

(60) Provisional application No. 62/059,180, filed on Oct. 3, 2014, provisional application No. 62/032,183, filed on Aug. 1, 2014.

(51) Int. Cl.
    *H05B 45/50*     (2020.01)
    *H05B 47/10*     (2020.01)

(56) References Cited

U.S. PATENT DOCUMENTS

| | | |
|---|---|---|
| 6,188,181 B1 | 2/2001 | Sinha et al. |
| 7,190,125 B2 | 3/2007 | McDonough et al. |
| 7,764,479 B2 | 7/2010 | Chitta et al. |
| 7,940,167 B2 | 5/2011 | Steiner et al. |
| 8,009,042 B2 | 8/2011 | Steiner et al. |
| 8,199,010 B2 | 6/2012 | Sloan et al. |
| 8,208,235 B2 | 6/2012 | Orchowski |
| 8,274,240 B2 | 9/2012 | Salvestrini |
| 8,278,839 B2 | 10/2012 | Salvestrini et al. |
| 8,410,706 B2 | 4/2013 | Steiner et al. |
| 8,466,628 B2 | 6/2013 | Shearer et al. |
| 8,492,987 B2 | 7/2013 | Nuhfer et al. |
| 8,492,988 B2 | 7/2013 | Nuhfer et al. |
| 8,796,940 B2 | 8/2014 | Altonen et al. |
| 8,803,432 B2 | 8/2014 | Hausman et al. |
| 9,595,880 B2 | 3/2017 | Knode et al. |
| 9,679,696 B2 | 6/2017 | Bhutani et al. |
| 10,236,789 B2 * | 3/2019 | Steiner .................. H02M 7/217 |
| 2010/0244709 A1 | 9/2010 | Steiner et al. |
| 2011/0080110 A1 | 4/2011 | Nuhfer et al. |
| 2012/0286681 A1 | 11/2012 | Hausman et al. |
| 2012/0306376 A1 | 12/2012 | Altonen et al. |
| 2012/0313535 A1 | 12/2012 | Bedell et al. |
| 2013/0030589 A1 | 1/2013 | Pessina et al. |
| 2014/0009084 A1 | 1/2014 | Veskovic |
| 2014/0176008 A1 * | 6/2014 | Harish Gopala Pillai .................... H05B 45/00 315/291 |
| 2014/0252980 A1 | 9/2014 | Salvestrini |
| 2014/0265935 A1 * | 9/2014 | Sadwick ................ H05B 45/10 315/307 |
| 2015/0244121 A1 | 8/2015 | Amelio et al. |
| 2016/0036349 A1 | 2/2016 | Steiner et al. |
| 2017/0223795 A1 | 8/2017 | Sadwick et al. |

\* cited by examiner

LOAD CONTROL DEVICE FOR CONTROLLING A DRIVER FOR A LIGHTING LOAD

CROSS-REFERENCE TO RELATED APPLICATIONS

This application is a continuation of U.S. patent application Ser. No. 16/118,406, filed Aug. 30, 2018, which is a division of U.S. patent application Ser. No. 14/813,006, filed Jul. 29, 2015, now U.S. Pat. No. 10,236,789, issued on Mar. 19, 2019, which claims the benefit of U.S. Provisional Application No. 62/059,180, filed Oct. 3, 2014, and U.S. Provisional Application No. 62/032,183, filed Aug. 1, 2014, the disclosures of which are incorporated by reference herein as if fully set forth.

BACKGROUND

A lighting source, such as light emitting diode (LED) light source, is typically driven by a load regulation device (e.g., such as an LED driver) in order to illuminate. A common control method for dimming an LED driver is "zero-to-ten-volt" (0-10V) control, which is sometimes referred to as 1-10V control. A 0-10V LED driver receives power from an AC power source, with an external mechanical switch typically coupled between the AC power source and the 0-10V driver to provide switched-hot voltage to the driver. The 0-10V driver controls the intensity of the connected LED light source in response to a 0-10V control signal received from an external 0-10V control device. Often, the 0-10V control device is mounted in an electrical wallbox and comprises an intensity adjustment actuator, e.g., a slider control. The 0-10 V control device regulates the direct-current (DC) voltage level of the 0-10 V control signal provided to the driver between a substantially low voltage (i.e., zero to one volt) to a maximum voltage (i.e., approximately ten volts) in response to an actuation of the intensity adjustment actuator.

An external 0-10V control device may include a current sink circuit and/or a current source circuit that operates in a non-linear manner. Due to the non-linear operation of the current sink/source circuit and/or the hardware of the driver, the actual magnitude of a 0-10V control signal provided by the current sink/source circuit may not correspond with a desired intensity level, as determined by a controller of the 0-10V control device and provided to the current sink circuit. Accordingly, there is a need for a control device that can compensate for the error introduced by the current sink circuit of the control device and/or the hardware of the driver.

SUMMARY

As described herein, a load control device may be configured to generate a control signal having a desired magnitude for controlling a load regulation device adapted to control the power delivered from an AC power source to an electrical load. The electrical load may be, for example, a light emitting diode (LED) light source. The load control device may comprise a control terminal adapted to be coupled to the load regulation device for providing the control signal to the load regulation device, a communication circuit coupled to the control terminal for generating the control signal, and a control circuit configured to generate an output signal that is provided to the communication circuit. The communication circuit may be characterized by non-linear operation. The communication circuit may be, for example, a 0-10V communication circuit for generating a 0-10V control signal. The control circuit may be configured to adjust the magnitude of the output signal to cause the communication circuit to adjust the magnitude of the control signal to a desired magnitude, where the desired magnitude indicates a target amount of power to be delivered to the electrical load. The control circuit may be configured to receive a feedback signal indicating the magnitude of the control signal. The control circuit may be further configured to determine a difference between the magnitude of the control signal and the desired magnitude and to adjust the magnitude of the output signal in response to the difference between the magnitude of the control signal and the desired magnitude, so as to adjust the magnitude of the control signal towards the desired magnitude.

A load control device may be configured to control a load regulation device that is adapted to control the power delivered to an electrical load. The load control device may be configured to determine if a fault condition exists at a control terminal that is adapted to be coupled to the load regulation device. The load control device may be configured to monitor the magnitude of a voltage at the control terminal to determine if the fault condition exists at the control terminal. For example, the load control device may monitor the magnitude of a voltage at the control terminal to determine if the load regulation device is compatible or incompatible with the communication circuit of the load control device. The load control device may be configured to determine that the load regulation is compatible with the load control device, for example, if the load regulation device is generating a link supply voltage at the control terminal. The load control device may be configured to determine that the load regulation device is incompatible with the communication circuit if the link supply voltage is not present at the control terminal, below a predetermined threshold value, and/or the like. If the load control device determines that the load regulation device is incompatible with the communication circuit, the load control device may determine that a fault condition exists at the control terminal and operate in a fault mode. The load control device may operate as an electronic switch in the fault mode (e.g., as opposed to a dimmer switch).

Other features and advantages of the present invention will become apparent from the following description of the invention that refers to the accompanying drawings.

DETAILED DESCRIPTION

Described herein are examples of a load control system for controlling the amount of power delivered to an electrical load, such as a lighting load, and more particularly, to a wall-mounted load control device for controlling a load regulation device, such as a light-emitting diode (LED) driver for an LED light source, via a control signal, such as a 0-10V control signal.

Figure 1:
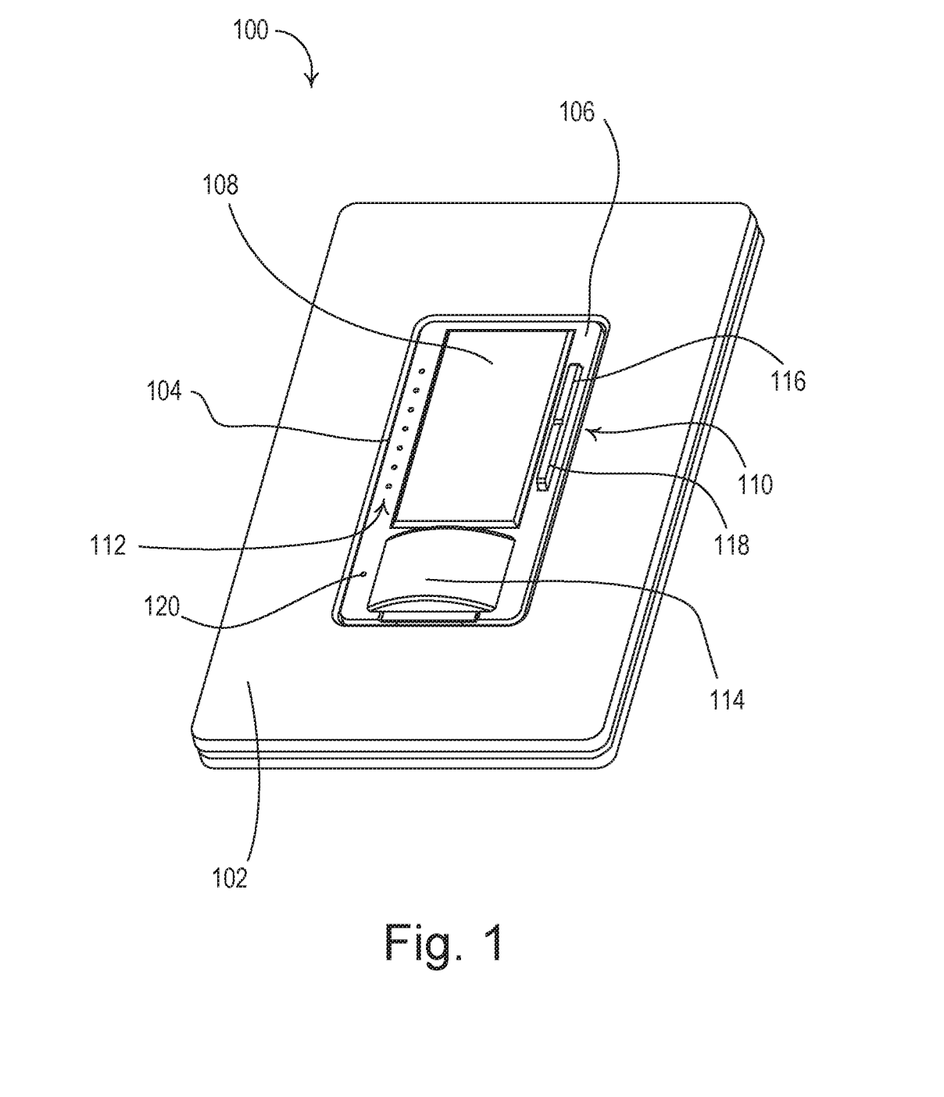
FIG. 1 is a perspective view of an example wall-mountable load control device.

FIG. 1 is a perspective view of an example wall-mountable load control device 100. In an example, the wall mountable load control device 100 may comprise a sensor dimmer switch. The load control device 100 may be adapted to be mounted in a single-gang electrical wallbox (not shown). The load control device 100 may comprise a plurality of electrical connections (e.g., screw terminals or wires) adapted to be coupled to an alternating-current (AC) power source (not shown) and an electrical load, for example, a lighting load (not shown). The load control device 100 may be adapted to be coupled in series electrical connection between the AC power source and the load for controlling the power delivered to the load. For example, the electrical load may comprise a load regulation circuit for driving a lighting load, such as an LED driver for controlling an LED light source. The load control device 100 may be configured to generate a control signal (e.g., a 0-10V control signal) that is coupled to the LED driver via a control wiring for controlling the intensity of the LED light source.

The load control device 100 may comprise a yoke (not shown) for mounting the load control device 100 to the electrical wallbox. The load control device 100 may comprise a faceplate 102 that is mechanically coupled to the yoke and has an opening 104 through which a bezel 106 of the load control device 100 may be received. The load control device 100 may further comprise a toggle actuator 108 (e.g., a control button) and an intensity adjustment actuator 110 (e.g., a rocker switch) arranged on the bezel 106. Successive actuations of the toggle actuator 108 may toggle, i.e., turn off and on, the lighting load. Actuations of an upper portion 116 or a lower portion 118 of the intensity adjustment actuator 110 may respectively increase or decrease the amount of power delivered to the lighting load and thus increase or decrease the intensity of the lighting load from a minimum intensity (e.g., approximately 1%) to a maximum intensity (e.g., approximately 100%).

The load control device 100 may further comprise a lens 114 arranged on the bezel 106. The load control device 100 may comprise an internal detector. The load control device 100 may be configured to detect occupancy and vacancy conditions in the space around (i.e., in the vicinity of) the load control device 100 using, for example, the internal detector. The internal detector may comprise a pyroelectric infrared (PIR) detector, which is operable to receive infrared energy from an occupant in the space via the lens 114 to thus sense the occupancy or vacancy condition in the space. The internal detector may comprise an ultrasonic detector, a microwave detector, or any combination of PIR detectors, ultrasonic detectors, and/or microwave detectors. The load control device 100 may be configured to turn on the electrical load in response to detecting an occupancy condition in the space and to turn off the electrical load in response to detecting a vacancy condition in the space. An example of a load control device configured to control an electrical load in response to detecting occupancy and vacancy conditions in described in greater detail in commonly-assigned U.S. Patent Application Publication No. 2012/0313535, published Dec. 13, 2012, entitled METHOD AND APPARATUS FOR ADJUSTING AN AMBIENT LIGHT THRESHOLD, the entire disclosure of which is hereby incorporated by reference.

The load control device 100 may further comprise a plurality of visual indicators 112, e.g., light-emitting diodes (LEDs), which may be arranged in a linear array on the bezel 106. The visual indicators 112 may be illuminated to provide feedback of the intensity of the lighting load. The load control device may further comprise an LED 120 positioned to illuminate the lens 114 to provide feedback to the user (e.g., during a programming mode and/or when the load control device detects an occupancy and/or vacancy condition). Examples of wall-mounted dimmer switches are described in greater detail in U.S. Pat. No. 5,248,919, issued Sep. 29, 1993, entitled LIGHTING CONTROL DEVICE, and U.S. patent application Ser. No. 13/780,514, filed Feb. 28, 2013, entitled WIRELESS LOAD CONTROL DEVICE, the entire disclosures of which are hereby incorporated by reference.

Figure 2:
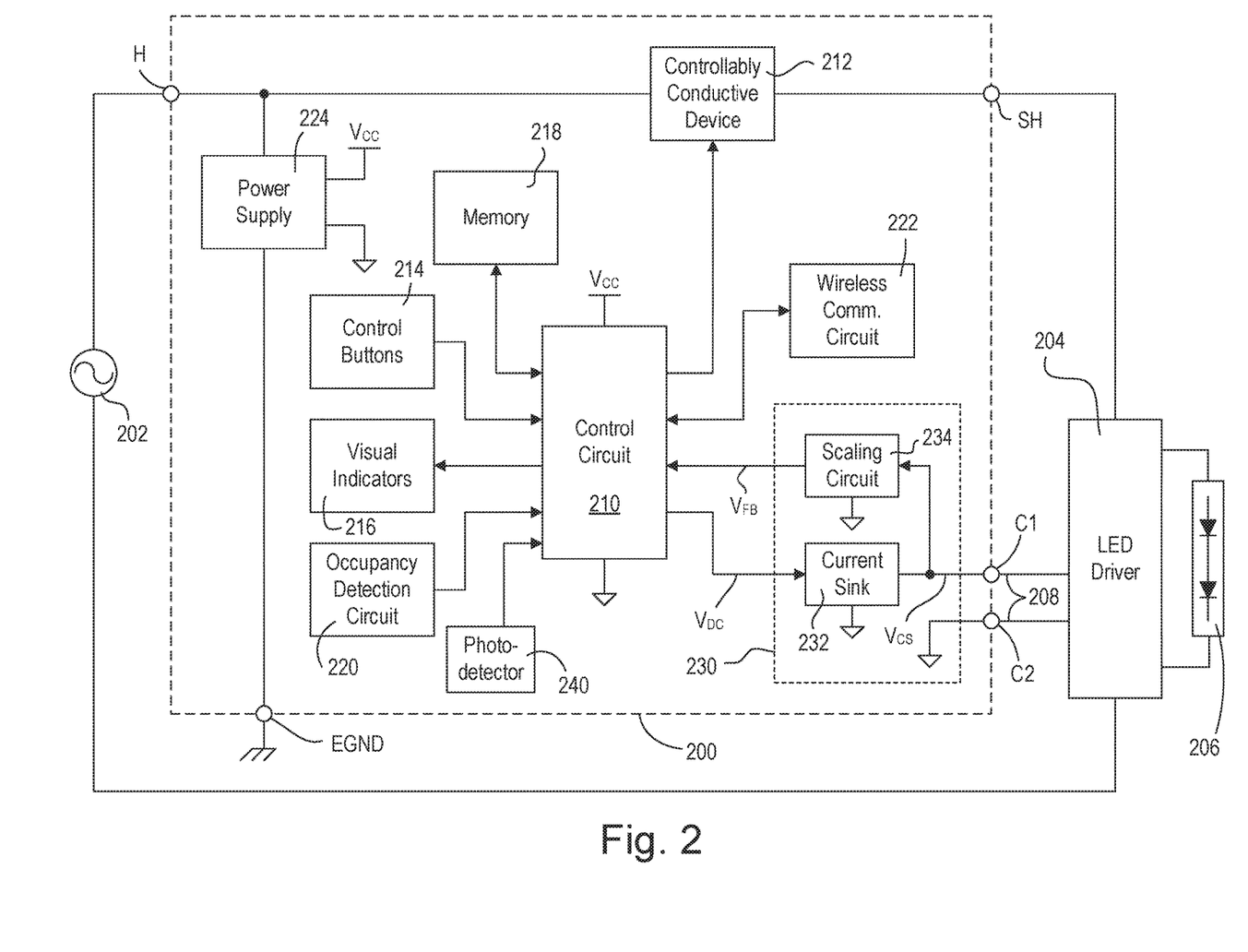
FIG. 2 is a simplified block diagram of an example 0-10V load control device.

FIG. 2 is a simplified block diagram of an example of a 0-10V load control device 200. For example, the 0-10V load control device 200 may be an example of the wall-mountable load control device 100 shown in FIG. 1. The load control device 200 may comprise a hot terminal H adapted to be coupled to an AC power source 202 and a switched hot terminal SH adapted to be coupled to an electrical load. For example, the electrical load may comprise a load regulation circuit for driving a lighting load, such as an LED driver 204 for controlling an LED light source 206. The LED driver 204 may be configured to control the power delivered to the LED light source 206, and thus the intensity of the LED light source 206 in response to a direct-current (DC) control signal $V_{CS}$ received from the load control device 200 via a control wiring 208. The LED driver 204 may be configured to turn the LED light source 206 on and off, and/or to adjust the intensity of the LED light source 206 between a low-end (e.g., minimum) intensity $L_{LE}$ and a high-end (e.g., maximum) intensity $L_{HE}$. The LED driver 204 may be configured to control the power delivered to the LED light source 206, for example, by regulating the voltage generated across the LED light source 206 and/or regulating the current conducted through the LED light source 206. Examples of an LED driver are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Patent Application Publication No. 2014/0009084, published Jan. 9, 2014, entitled FORWARD CONVERTER HAVING A PRIMARY-SIDE CURRENT SENSE CIRCUIT, the entire disclosures of which are hereby incorporated by reference. Alternatively, the electrical load may comprise an electronic ballast for driving a fluorescent lamp.

The load control device 200 may comprise a control circuit 210. The control circuit 210 may control the operation of the load control device 200. For example, the control circuit 210 may generate the control signal $V_{CS}$ for adjusting the intensity of the LED light source 206. The control circuit 210 may comprise any suitable controller or processing device, such as, for example, a microprocessor, a programmable logic device (PLD), a microcontroller, or an application specific integrated circuit (ASIC). The load control device 200 may comprise a controllably conductive device 212 coupled in series electrical connection between the hot terminal H and the switched hot terminal SH for controlling the power delivered to the LED driver 204 and the LED light source 206. The controllably conductive device 212 may comprise a switching circuit, such as, for example, a relay, or a bidirectional semiconductor switch, such as, for example, a triac, one or more silicon-controlled rectifiers (SCRs), a field-effect transistor (FET) in a rectifier bridge, two FETs in anti-series connection, one or more insulated-gate bipolar junction transistors (IGBTs), or any suitable semiconductor switching circuit. The control circuit 210 may be coupled to the controllably conductive device 212 for rendering the controllably conductive device 212 conductive and non-conductive to thus control the power delivered to the LED driver 204 and the LED light source 206 (e.g., to turn the LED light source 206 on and off, and/or to adjust the intensity of the LED light source 206 between the low-end intensity $L_{LE}$ and the high-end intensity $L_{HE}$).

The control circuit 210 may be configured to receive inputs from one or more control buttons 214 (e.g., the toggle actuator 108 and/or the intensity adjustment actuator 110 of the load control device 100 shown in FIG. 1). The control circuit 210 may be configured to render the controllably conductive device 212 conductive and non-conductive to turn the LED light source 206 on and off in response to actuations of the control buttons 214. The control circuit 210 may be configured to operate in a dimmer mode in which the control circuit determines a desired light intensity $L_{DES}$ for the LED light source 206 in response to actuations of the control buttons 214 and controls the control signal $V_{CS}$ to adjust the intensity of the LED light source to the desired light intensity (e.g., between the low-end intensity $L_{LE}$ and the high-end intensity $L_{HE}$).

When the control circuit 210 is operating in the dimmer mode and a toggle actuator (e.g., the toggle actuator 108) is actuated, the control circuit 210 may be configured to "fade" the LED light source 206 on and off (e.g., to gradually adjust the intensity on and off over a fade period). For example, when fading the LED light source 206 off, the control circuit 210 may be configured to control the control signal $V_{CS}$ to gradually adjust the intensity of the LED light source 206 towards the low-end intensity $L_{LE}$ over the fade period and then render the controllably conductive device 212 non-conductive at the end of the fade period to turn the LED light source off.

The load control device 200 may further comprise one or more visual indicators 216 (e.g., LEDs). The visual indicators 112 of the load control device 100 may be an example of the visual indicators 216. The control circuit 210 may be coupled to the visual indicators 216 to illuminate the visual indicators 216 to provide feedback to a user. In addition, one of the visual indicators 216 (e.g., the LED 120) may be positioned to illuminate a lens (e.g., the lens 114) of the load control device 200.

The control circuit 210 may also be coupled to a memory 218, for example, for storage of operational characteristics of the load control device 200. The memory 218 may be implemented as an external integrated circuit (IC) or as an internal circuit of the control circuit 210. The control circuit 210 may be configured to modify the operational characteristics stored in the memory in response to a user executing an advanced programming mode of the load control device 200, e.g., in response to one or more actuations of the control buttons 214. An example of an advanced programming mode for a wall-mountable load control device is described in greater detail in U.S. Pat. No. 7,190,125, issued Mar. 13, 2007, entitled PROGRAMMABLE WALLBOX DIMMER, the entire disclosure of which is hereby incorporated by reference.

The load control device 200 may further comprise a sensor circuit. For example, the sensor circuit may comprise an occupancy detection circuit 220 operable to detect an occupancy or vacancy condition in the vicinity of the load control device 200. The occupancy detection circuit 220 may comprise a detector for detecting an occupancy or vacancy condition in the space. The detector may comprise one or more of a pyroelectric infrared (PIR) detector, an ultrasonic detector, and/or a microwave detector. For example, a PIR detector may be operable to receive infrared energy from an occupant in the space around the load control device 200 through a lens (e.g., the lens 114 shown in FIG. 1) to thus sense the occupancy condition in the space. The control circuit 210 may be configured to determine a vacancy condition in the space after a timeout period expires since the last occupancy condition was detected. The control circuit 210 may be configured to turn the LED light source 206 on and off and to adjust the intensity of the LED light source 206 in response to the occupancy detection circuit 220 detecting occupancy and/or vacancy conditions.

The load control device 200 may comprise a communication circuit, e.g., a wireless communication circuit 222 for transmitting and/or receiving wireless signals. For example, the wireless communication circuit 222 may comprise a radio-frequency (RF) transceiver, an RF receiver, an RF transmitter, an infrared (IR) receiver, and/or other suitable wireless communication circuit. The load control device 200 may be operable to receive wireless signals from an input device, for example, a remote wireless occupancy or vacancy sensor, a networked device (e.g., a mobile device), a remote control device, and/or the like. The control circuit 210 may be operable to control the LED light source 206 in response to the wireless signals received from the input device. For example, the control circuit 210 may be operable to control the LED light source 206 in response to the wireless signals received from the remote wireless occupancy or vacancy sensor in a similar manner as the control circuit operates in response to the internal occupancy detection circuit 220. Examples of remote wireless occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 11, 2011, entitled RADIO-FREQUENCY LIGHTING CONTROL SYSTEM WITH OCCUPANCY SENSING; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference. The communication circuit 222 may comprise a wired communication circuit operable to transmit and receive digital messages over a wired communication link, such as, for example, a serial communication link, an Ethernet communication link, a power-line carrier communication link, and/or other suitable digital communication link.

The load control device 200 may comprise a power supply 224 for generating a direct-current (DC) supply voltage $V_{CC}$ for powering the control circuit 210, the memory 218, the wireless communication circuit 222, and/or other low-voltage circuitry of the load control device 200. The power supply 224 may be coupled between the hot terminal H and an earth ground terminal EGND that may be coupled to an earth ground connection in the electrical wallbox in which the load control device 200 is mounted. The load control device 200 may (e.g., alternatively) comprise a neutral connection (not shown) adapted to be coupled to the neutral side of the AC power source 202, and the power supply 224 could be coupled between the hot terminal H and the neutral terminal. The load control device 200 could comprise a "two-wire" device that does not require an electrical connection to earth ground or neutral, and has one or more power supplies adapted to conduct a charging current through the LED driver 204.

The load control device 200 may comprise first and second control terminals C1, C2 adapted to be coupled to the LED driver 204 via the control wiring 208. The load control device 200 may comprise a driver communication circuit 230 (e.g., a 0-10V circuit) for generating a control signal $V_{CS}$ (e.g., a 0-10V control signal or a 10-0V control signal). The driver communication circuit 230 may comprise a current sink circuit 232 adapted to sink current through the LED driver 204 via the control wiring 208. The current sink circuit 232 may be characterized by linear or non-linear operation. The LED driver 204 may be configured to generate a link supply voltage (e.g., approximately 10 V) to allow the current sink circuit 232 to generate the control signal $V_{CS}$ on the control wiring 208.

The control circuit 210 may generate a direct-current (DC) output signal $V_{DC}$ and send the output signal $V_{DC}$ to the communication driver circuit 230. For example, the control circuit 210 may comprise a digital-to-analog converter (DAC) for generating a DC output signal $V_{DC}$ that is received by the current sink circuit 232 for generating the control signal $V_{CS}$. The control circuit 210 may adjust the magnitude of the control signal $V_{CS}$ by adjusting the magnitude of the output signal $V_{DC}$. The control circuit 210 may control the output signal $V_{DC}$ in order to control the magnitude of the control signals $V_{CS}$ to have a desired DC magnitude $V_{DES}$. For example, the control circuit 210 may control the magnitude of the control signals $V_{CS}$ to have a desired DC magnitude $V_{DES}$ that ranges between zero and ten volts and indicates a target intensity for the LED light source 206 (e.g., indicates a target amount of power to be delivered to the LED light source 206). Alternatively, the output signal $V_{DC}$ could comprise a pulse-width modulated (PWM) signal or variable-frequency waveform, in response to which the current sink circuit 232 is configured to adjust the magnitude of the control signal $V_{CS}$. In addition, the driver communication circuit 230 could (e.g., alternatively) comprise a current source circuit or a current source/sink circuit for generating the control signal $V_{CS}$ in response to the output signal $V_{DC}$.

The control circuit 210 may be configured to receive the feedback signal indicating the magnitude of the control signal $V_{CS}$ generated by the current sink circuit 232. For example, the driver communication circuit 230 may comprise a scaling circuit 234 (e.g., a resistor divider) for generating a feedback voltage $V_{FB}$, which may be a scaled version of the control signal $V_{CS}$. The control circuit 210 may receive (e.g., sample) the feedback voltage $V_{FB}$. The control circuit 210 may determine a difference between the magnitude of the control signal $V_{CS}$ and the desired DC magnitude $V_{DES}$. The control circuit may adjust the magnitude of the output signal $V_{DC}$ in response to the difference between the magnitude of the control signal $V_{CS}$ and the desired DC magnitude $V_{DES}$, for example, so as to adjust the magnitude of the control signal $V_{CS}$ towards the desired DC magnitude $V_{DES}$.

Figure 3:
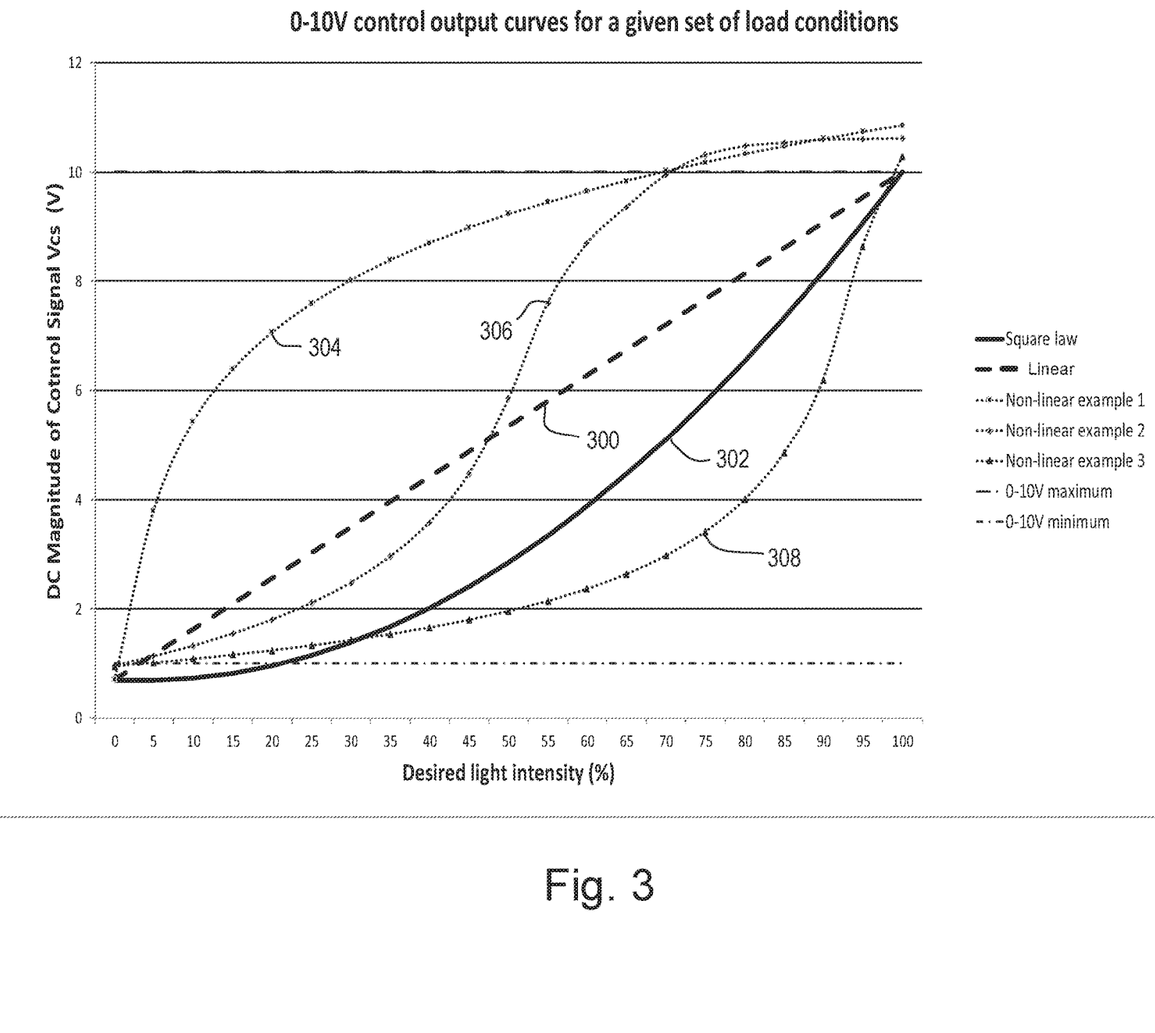
FIG. 3 shows example plots of a magnitude of a control signal with respect to a desired light intensity of a lighting load.

FIG. 3 shows example plots of the magnitude of the control signal $V_{CS}$ with respect to the desired light intensity of the LED light source 206 (e.g., as determined from the user inputs provided by the control buttons 214 and/or the output signal $V_{DC}$). The control circuit 210 may adjust the DC magnitude of the control signal $V_{CS}$ to indicate the target intensity of the LED light source 206 to the LED driver 204 in one of a plurality of dimming modes, e.g., a linear mode and/or a square-law mode. For example, in the linear mode, the desired magnitude $V_{DES}$ of the control signal $V_{CS}$ may be a linear function of the desired light intensity $L_{DES}$ of the LED light source 206, for example, as shown by a linear plot 300 in FIG. 3. In the square-law mode, the desired magnitude $V_{DES}$ of the control signal $V_{CS}$ may be a non-linear function of the desired light intensity $L_{DES}$ of the LED light source 206 (e.g., a predetermined relationship), for example, as shown by a square-law plot 302 in FIG. 3. A square-law mode may provide for the actual light output of the LED light source 206 to be perceived to be linear by the human eye with respect to the desired light intensity $L_{DES}$ indicated by the control buttons 214. The control circuit 210 may be configured to switch between the linear mode and the square-law mode, for example, in response to inputs received during the advanced programming mode of the load control device 200.

The control circuit 210 may control the control signal $V_{CS}$ to be either a 0-10V control signal or a 10-0V control signal. When receiving a 0-10V control signal, the LED driver 204 may control the LED light source 206 to the low-end intensity $L_{LE}$ when the 0-10V control signal has a magnitude of zero volts, to the high-end intensity $L_{HE}$ when the 0-10V control signal has a magnitude of ten volts, and to an intensity that is scaled (e.g., linearly or non-linearly depending on the dimming mode) between the low-end intensity $L_{LE}$ and the high-end intensity $L_{HE}$ when the 0-10V control signal has a magnitude between zero and ten volts. When receiving a 10-0V control signal, the LED driver 204 may control the LED light source 206 to the low-end intensity $L_{LE}$ when the 10-0V control signal has a magnitude of ten volts, to the high-end intensity $L_{HE}$ when the 10-0V control signal has a magnitude of zero volts, and to an intensity that is scaled (e.g., linearly or non-linearly depending on the dimming mode) between the low-end intensity $L_{LE}$ and the high-end intensity $L_{HE}$ when the 10-0V control signal has a magnitude between ten and zero volts.

The actual magnitude of the control signal $V_{CS}$ may not correspond with the desired magnitude $V_{DES}$ as intended by the control circuit 210, for example, due to non-linear operation of the current sink circuit 232 and/or the hardware of the LED driver 204 to which the control terminals C1, C2 are connected. When the control circuit 210 is operating in a linear mode (e.g., according to the linear plot 300) or a non-linear mode (e.g., according to the square law plot 302), the actual magnitude of the control signal $V_{CS}$ may not correspond with the desired plot (e.g., linear plot 300 or square law plot 302). For example, the actual magnitude of the control signal $V_{CS}$ may correspond with an unintended plot, such as plots 304, 306, or 308 in FIG. 3. The control circuit 210 may be configured to monitor the magnitude of the control signal $V_{CS}$ and to adjust the magnitude of the output signal $V_{DC}$ to compensate for errors in the magnitude of the control signal $V_{CS}$ (e.g., using closed loop control). For example, the control circuit 210 may sample the feedback signal $V_{FB}$ from the scaling circuit 234 to determine the magnitude of the control signal $V_{CS}$. If the magnitude of the control signal $V_{CS}$ is equal (e.g., approximately equal) to the desired magnitude $V_{DES}$, the control circuit 210 may not adjust the magnitude of the output signal $V_{DC}$. However, if the magnitude of the control signal $V_{CS}$ is different than the desired magnitude $V_{DES}$, the control circuit 210 may calculate an error $e_{CS}$ between the magnitude of the control signal $V_{CS}$ and the desired magnitude $V_{DES}$ (e.g., $e_{CS}=V_{CS}-V_{DES}$), and determine a control signal adjustment value $\Delta_{CS}$ based upon the calculated error $e_{CS}$. The control circuit 210 may then adjust the magnitude of the output signal $V_{DC}$ using the control signal adjustment value $\Delta_{CS}$ (e.g., $V_{DC}=V_{DC}+\Delta_{CS}$) to bring the magnitude of the control signal $V_{CS}$ towards the desired magnitude $V_{DES}$ (e.g., to the magnitudes shown by linear plot 300 or the square-law plot 302 in FIG. 3). For example, the control circuit 210 may use closed loop integral control to adjust the magnitude of the output signal $V_{DC}$ in response to the error $e_{CS}$.

When the control circuit 210 turns the LED light source 206 on, there may be a delay between the time at which the controllably conductive device 212 is rendered conductive and the time at which the LED driver 204 is powered up and generating the link supply voltage. Because of this delay, the error $e_{CS}$ between the magnitude of the control signal $V_{CS}$ and the desired magnitude may have a large value before the LED driver 204 begins generating the link supply voltage. Accordingly, when turning on and/or off the LED light source 206, the control circuit 210 may override the closed loop control of the output signal $V_{DC}$. For example, when turning on the LED light source 206, the control circuit 210 may not adjust the magnitude of the output signal $V_{DC}$ in response to the error $e_{CS}$ and may feed a predetermined value into DAC for a time period after the controllably conductive device 212 is rendered conductive. The predetermined value may be, for example, a low-end DAC-input value that corresponds to the low-end intensity $L_{LE}$. This may be performed to ensure that the LED driver 204 has time to begin generating the link supply voltage before the control circuit 210 uses closed loop control to adjust the magnitude of the output signal $V_{DC}$, and/or, for example, may avoid instability and oscillations in the magnitude of the control signal $V_{CS}$ when the control circuit 210 is turning on the LED light source 206. The control circuit 210 may override the closed loop control of the output signal $V_{DC}$ when turning off the LED light source 206, for example, and fade the LED light source 206 to off according to a predetermined fade rate.

The control circuit 210 may be configured to measure and store the low-end DAC-input value that may be used when overriding the closed loop control. For example, the control circuit 210 may be configured to measure the value that is input to the DAC when the control circuit 210 is fading the LED light source off and the intensity of the LED light source is at the low-end intensity $L_{LE}$. The control circuit 210 may be configured to store this measured value in the memory 218 as the low-end DAC-input value.

The control circuit 210 may also be configured to monitor the magnitude of the voltage at the first control terminal C1 (e.g., the control signal $V_{CS}$) to determine if a fault condition exists. A fault condition may exist due to a miswire condition on the control wiring 208 coupled to the control terminals C1, C2. For example, a miswire condition may exist if the control terminals C1, C2 are shorted together, if at least one of the control terminals C1, C2 is not coupled to the control wiring 208, and/or if the control wiring 208 is not coupled to an LED driver. In addition, a fault condition may exist when the LED driver 204 that requires the load control device 200 to source current via the control terminals C1, C2 is coupled to the load control device 200. As shown in FIG. 2, the driver communication circuit 230 of the load control device 200 may comprise the current sink circuit 232 (e.g., and not a current source circuit). Accordingly, the load control device 200 may not be configured to control an LED driver that requires the load control device 200 to source current via the control terminals C1, C2. An LED driver that requires the load control device 200 to source current will not generate the link supply voltage on the control wiring 208. Accordingly, before beginning to generate the output signal $V_{DC}$ to thus generate the control signal $V_{CS}$ on the control wiring 208 (e.g., a startup), the control circuit 210 may be configured to monitor the magnitude of the voltage at the first control terminal C1 to determine if the connected LED driver 204 is generating the link supply voltage or not. If the link supply voltage is present on the control wiring 208, the control circuit 210 may then operate in a normal mode to generate the control signal $V_{CS}$ to control the LED driver 204.

However, if the control circuit 210 determines that a fault condition exists, the control circuit 210 may enter a fault mode (e.g., as opposed to the normal mode of operation). For example, if the link supply voltage is not present on the control wiring 208, the control circuit 210 may enter a fault mode. In the fault mode, the control circuit 210 may blink one or more of the visual indicators 216 and/or illuminate the lens (e.g., the lens 114) to indicate to a user that a miswire condition may exist or an incompatible LED driver may be coupled to the load control device 200. For example, the control circuit 210 may blink one or more of the visual indicators 216 and/or illuminate the lens when the load control device 200 is powered up and the control circuit 210 determines that the link supply voltage is not present on the control wiring 208. In addition, the control circuit 210 may blink one or more of the visual indicators 216 and/or illuminate the lens when the control circuit 210 is operating in the fault mode and the intensity adjustment actuator 110 is actuated (e.g., a user is trying to adjust the intensity of the controlled LED light source).

In the fault mode, the load control device 200 may not be able to adjust the intensity of the LED light source 206 (e.g., due to the miswire condition on the load wiring or an incompatible LED driver coupled to the load control device 200). For example, if the control circuit 210 attempts to fade the LED light source off in the fault mode, the intensity of the LED light source 206 may stay at the maximum intensity while the control circuit is controlling the control signal $V_{CS}$ to gradually decrease the intensity, and then turn off the LED light source after the fade period when the controllably conductive device 212 is rendered non-conductive. This condition may appear to a user as a delay in turning off the LED light source (e.g., rather than fading to off).

Accordingly, when the control circuit 210 is in the fault mode, the control circuit 210 may be configured to operate in a switch mode in which the load control device 200 operates as if the load control device 200 were an electronic switch (e.g., rather than operating as a dimmer switch in the dimmer mode). In the switch mode, the control circuit 210 may only be able to control the controllably conductive device 212 to turn the LED light source 206 on and off in response to actuations of the toggle actuator 108. For example, in the switch mode, the control circuit 210 may simply switch the setpoint for the LED light source between 100% (e.g., when the LED light source is on) and 0% (e.g., when the LED light source is off). The control circuit 210 may be configured to control the fade period to zero seconds when in the switch mode, such that the control circuit 210 controls the controllably conductive device 212 to immediately turn on and off the LED light source in response to actuations of the toggle actuator 108.

The control circuit 210 may be configured to monitor the magnitude of the voltage at the first control terminal C1 to determine if a fault condition exists whenever the unit is powered up. For example, the control circuit 210 be configured to wait for a delay period (e.g., approximately five seconds) before determining if a fault condition exits on the control wiring 208 (e.g., to allow the LED driver 204 to power up and begin generating the link supply voltage). In addition, when operating in the fault mode, the control circuit 210 may monitor (e.g., periodically monitor) the magnitude of the voltage at the first control terminal C1 (e.g., the control signal $V_{CS}$) to determine if the fault condition has ceased. For example, the control circuit 210 may switch from the fault mode to the normal mode if the LED driver 204 acts like a source (e.g., the LED driver 204 is stable). The control circuit 210 may be configured to switch back to the normal mode in response to determining that the link supply voltage is present on the control wiring 208. For example, the control circuit 210 may be configured to change back to the normal mode if the magnitude of the voltage $V_{CS}$ at the control terminal is greater than a predetermined voltage threshold (e.g., approximately 1000 mV).

The control circuit 210 could be configured to monitor the magnitude of the voltage at the first control terminal C1 to determine how to appropriately generate the control signal $V_{CS}$. For example, the driver communication circuit 230 of the load control device 200 may comprise a current source/sink circuit (e.g., in lieu of the current sink circuit 232). The current source/sink circuit may operate as either a current source or a current sink. If the driver communication circuit 230 comprises a current source/sink circuit, the control circuit 210 may determine whether the current source/sink circuit should source or sink current depending whether the link supply voltage is present at the first control terminal C1 or not. For example, if the link supply voltage is present on the control wiring 208, the control circuit 210 could control the current source/sink circuit to sink current, and if the link supply voltage is not present on the control wiring, the control circuit could control the current source/sink circuit to source current.

The load control device 200 may comprise a photodetector 240. The photodetector 240 may comprise a reverse-biased LED, an optical detector, a photoresistor, a photovoltaic cell, an active-pixel sensor, and/or the like. The photodetector 240 may be integral to the load control device 200 or remote from the load control device 200. For example, the photodetector 240 may be located inside of the load control device 200 adjacent to the occupancy detection circuit 220. The photodetector 240 may receive ambient light outside of the load control device 200 through a lens (e.g., the lens 114). The load control device 200 may receive information from the photodetector 240 indicating an ambient light level in the vicinity of the load control device 200.

The load control device 200 (e.g., the control circuit 210) may use the photodetector 240 to determine whether or not to turn on the LED light source 206 in response to an occupancy condition. For example, the load control device 200 may receive an occupancy condition from the photodetector 240, measure the ambient lighting level (e.g., with the LED light source 206 off) using the photodetector 240, and compare the ambient lighting level against a threshold. If the ambient lighting level is below the threshold (e.g., there is not sufficient light in the space for a user to see), the load control device 200 may turn on the LED light source 206. If the ambient lighting level is above the threshold (e.g., there is sufficient light in the space), the load control device 200 may not turn on the LED light source 206, for example, to increase energy savings. The load control device 200 may then be configured to turn on the LED light source 206 in response to actuations of the control buttons 214.

The load control device 200 (e.g., the control circuit 210) may use the photodetector 240 to perform daylighting. For example, the load control device 200 may determine the ambient lighting level using the photodetector 240, and adjust the output signal $V_{DC}$ to compensate for the ambient light level in the space, for example, to increase energy savings.

The load control device 200 (e.g., the control circuit 210) may determine a dimming mode (e.g., a dim curve model) of the LED driver 204 and LED light source 206, for example, using the photodetector 240. For example, the load control device 200 may be placed in the advanced programming mode. The ambient light may be determined, for example, using the photodetector 240 when the LED light source 206 is off. The load control device 200 (e.g., the control circuit 210) may adjust the output signal $V_{DC}$ such that the desired intensity of the LED light source 206 is adjusted through a plurality of different intensity levels, for example, 0% (i.e., off), 25%, 50%, 75%, and 100%. While adjusting the intensity of the output signal $V_{DC}$, the photodetector 240 may measure the intensity level of the LED light source 206. The load control device 200 may remove the ambient light, as measured by the photodetector 240, from intensity levels of the LED light source 206. If the procedure is executed at night (e.g., when the ambient light level is below a predetermined threshold), the load control device 200 may not need to remove the ambient light from the intensity levels of the LED light source 206. The load control device 200 may also receive feedback from a daylight sensor, and use the daylight information to further refine the measured intensity level of the LED light source 206 at the plurality of different intensity levels. The load control device 200 may correlate the values of the output signal $V_{DC}$ with the measured intensity levels of the LED light source 206 to determine the dimming mode of and/or for the LED driver 204 and LED light source 206. For example, the load control device 200 may determine which of a plurality of predefined dimming modes most closely matches the results to determine the dimming mode of and/or for the LED driver 204 and LED light source 206. The load control device may calibrate a dimming mode that is unique for the LED driver 204 and LED light source 206. For example, the load control device 200 may determine a piecewise linearization table to generate a unique dimming mode for the LED driver 204 and LED light source 206 (e.g., calculate each point based on the plurality of different intensity levels, calculate the slope between each point, and use the points and slope to compute the values in-between). The load control device 200 may be configured to switch between one or more dimming modes, for example, when placed in the advanced programming mode.

The load control device 200 (e.g., the control circuit 210) may use the photodetector 240 to measure/detect flickering of the LED light source 206. For example, if the control circuit 210 determines that the LED light source 206 is flickering and the LED light source 206 is being operated at or near the low-end intensity $L_{LE}$, then the control circuit 210 may increase (e.g., trim) the low-end intensity $L_{LE}$ level of the LED light source 206, for example, to prevent flickering of the LED light source 206 at low-end.

Figure 4:
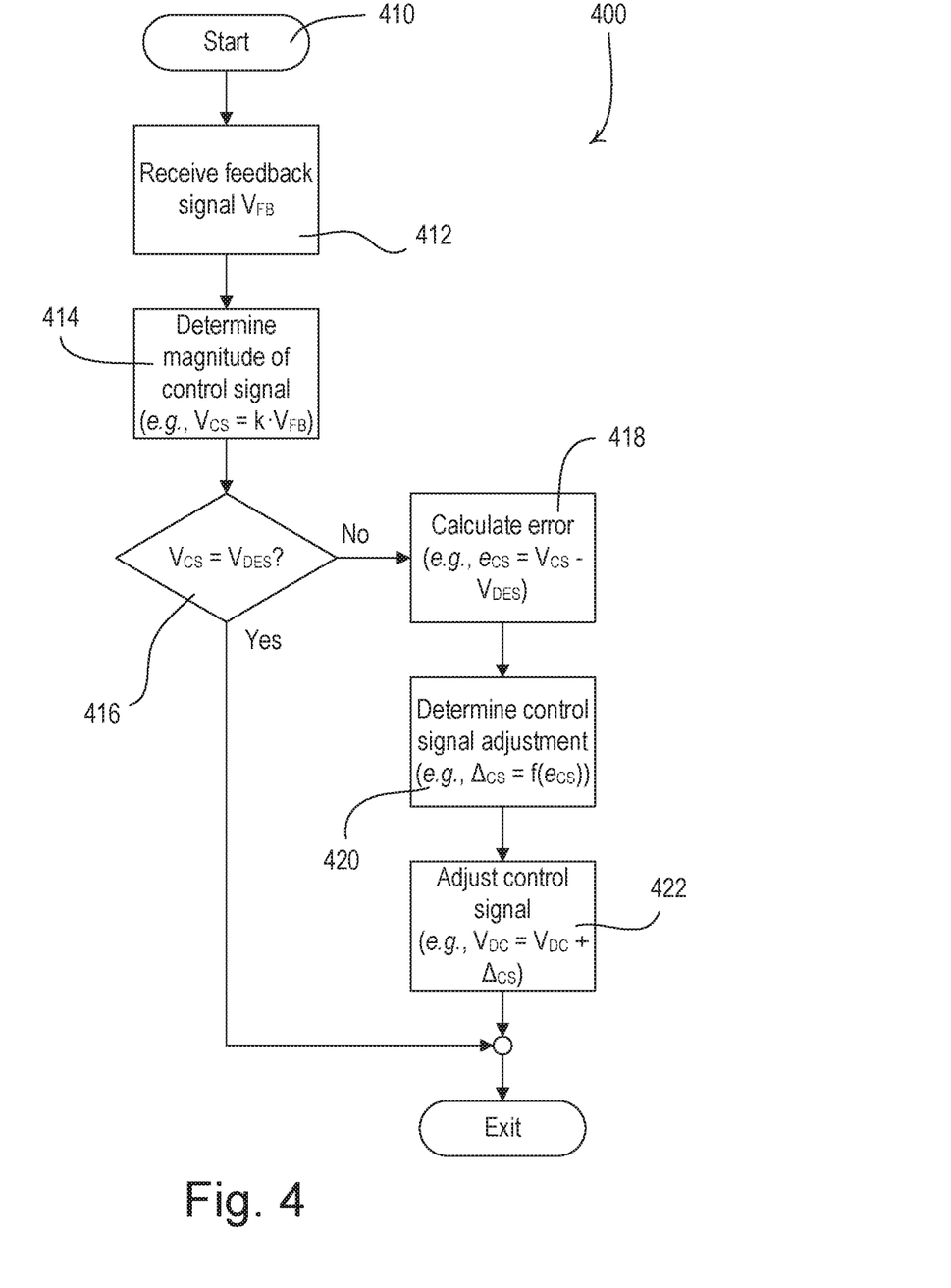
FIG. 4 is an example flowchart of a control procedure.

FIG. 4 is a flowchart of an example control procedure 400 executed by a control circuit of a load control device (e.g., the control circuit 210 of the load control device 200 shown in FIG. 2). The control circuit may execute the control procedure 400 in order to generate a DC output signal (e.g., the output signal $V_{DC}$) for causing a communication circuit (e.g., the driver communication circuit 230) to generate a control signal (e.g., the control signal $V_{CS}$) for controlling a load regulation device (e.g., LED driver 204) for an electrical load (e.g., the LED light source 206). The control circuit may execute the control procedure 400 executed periodically (e.g., every 25 ms). The control procedure 400 may start at 410. At 412, the control circuit may receive (e.g., sample) a feedback signal that indicates the magnitude of the control signal $V_{CS}$ (e.g., the feedback signal $V_{FB}$). The control circuit may determine the magnitude of the control signal $V_{CS}$ at 414, e.g., by scaling the sampled magnitude of the feedback signal $V_{FB}$ by a constant k (e.g., approximately four). If the magnitude of the control signal $V_{CS}$ is equal (e.g., approximately equal) to the desired magnitude $V_{DES}$ at 416, the control procedure 400 may simply exit the control procedure 400 without adjusting the output signal $V_{DC}$.

However, if the magnitude of the control signal $V_{CS}$ is not equal (e.g., approximately equal) to the desired magnitude $V_{DES}$ at 416, the control circuit may calculate the difference between the magnitude of the control signal $V_{CS}$ and the desired magnitude $V_{DES}$ to determine an error $e_{CS}$ at 418 (e.g., $e_{CS}=V_{CS}-V_{DES}$). The control circuit may then determine a control signal adjustment value $\Delta_{CS}$ using the error $e_{CS}$ at 420, e.g., by calculating the control signal adjustment value $\Delta_{CS}$ as a function of the error $e_{CS}$. The control circuit may then adjust the magnitude of the output signal $V_{DC}$ to adjust the magnitude of the control signal $V_{CS}$ towards the desired magnitude $V_{DES}$ at 422, e.g., by applying the control signal adjustment value $\Delta_{CS}$ to the output signal $V_{DC}$, before the control procedure 400 exits.

Figure 5:
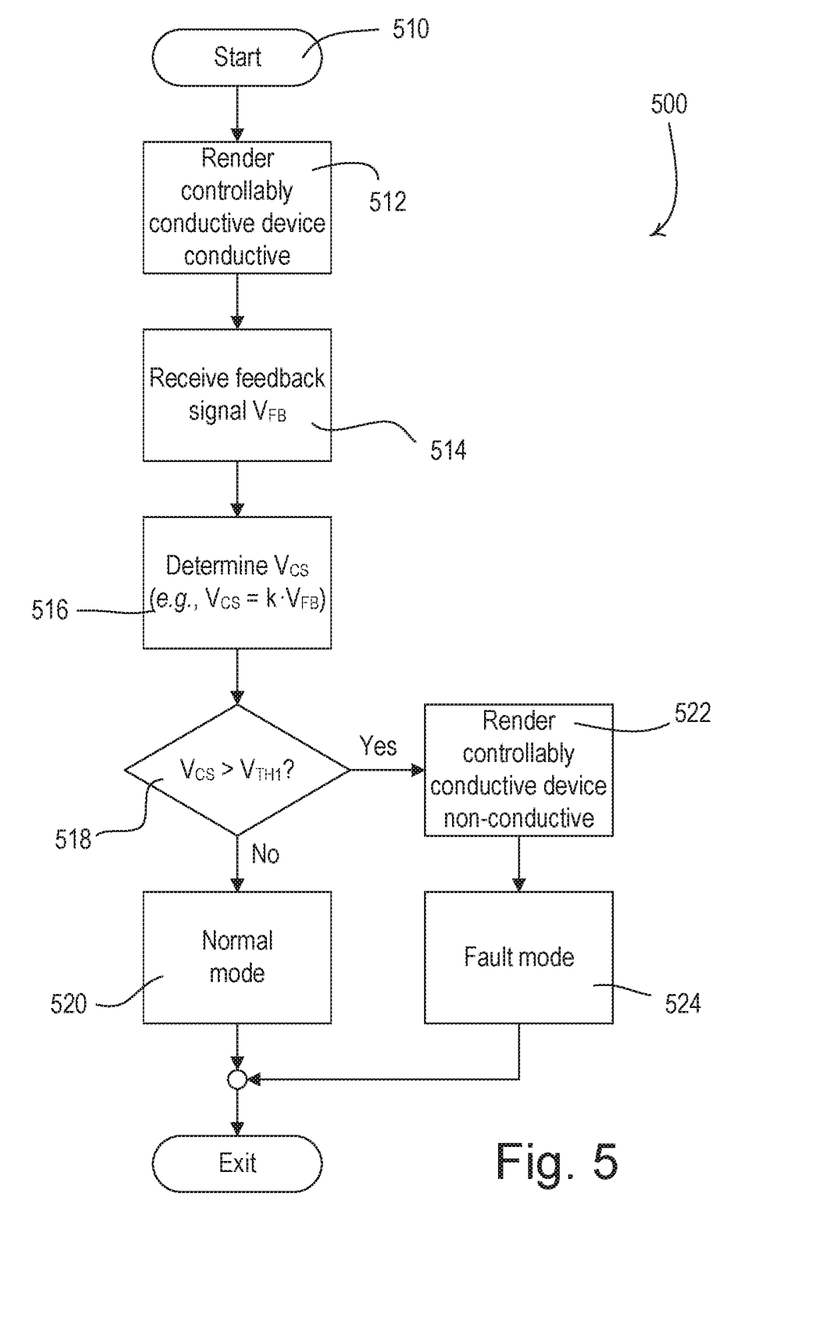
FIG. 5 is an example flowchart of a startup procedure.

FIG. 5 is a flowchart of an example startup procedure 500 by a control circuit of a load control device (e.g., the control circuit 210 of the load control device 200 shown in FIG. 2). The control circuit may execute the startup procedure 500 in order to initialize a communication circuit (e.g., the driver communication circuit 230) for generating a control signal (e.g., the control signal $V_{CS}$) for controlling a load regulation device (e.g., the LED driver 204) for an electrical load (e.g., the LED light source 206). For example, the control circuit may execute the startup procedure 500 to determine if the load regulation device is compatible with the communication circuit of the load control device. The control circuit may execute the startup procedure 500 at startup of the control circuit at 510, e.g., when the load control device 200 is first powered up. At 512, the control circuit may render a controllably conductive device (e.g., the controllably conductive device 210) conductive to apply power to the load regulation device. At 514, the control circuit may receive (e.g., sample) a feedback signal that indicates the magnitude of a voltage $V_{CS}$ at a control terminal coupled to the load regulation device (e.g., the feedback signal $V_{FB}$). The control circuit may wait (e.g., for approximately five seconds) before sampling the feedback signal that indicates the magnitude of a voltage $V_{CS}$ at a control terminal coupled to the load regulation device (e.g., the feedback signal $V_{FB}$) at 514. The control circuit may determine the magnitude of the voltage $V_{CS}$ at the control terminal at 516, e.g., by scaling the sampled magnitude of the feedback signal $V_{FB}$ by a constant k (e.g., approximately four).

If the magnitude of the voltage $V_{CS}$ at the control terminal is greater than a first predetermined threshold $V_{TH1}$ (e.g., approximately 300 mV) at 518 (e.g., if the link supply voltage is present at the control terminal), the control circuit may enter a normal mode at 520 and the startup procedure 500 exits. During the normal mode, the control circuit may control the magnitude of a control signal at the control terminal to adjust the amount of power delivered to the electrical load (e.g., normal operation of the load control device). If the magnitude of the voltage $V_{CS}$ at the control terminal is not greater than the first predetermined threshold $V_{TH1}$ at 518 (e.g., if the link supply voltage is not present at the control terminal), the control circuit may render the controllably conductive device non-conductive at 522 to disconnect power from the load regulation device, and/or may enter a fault mode at 524, before the startup procedure 500 exits. In the fault mode, the control circuit may blink one or more of the visual indicators (e.g., the visual indicators 112, 216) and/or illuminate a lens (e.g., the lens 114) to indicate to a user that the load regulation device is incompatible with the load control device. The control circuit may change to a switch mode at 524. The control circuit may control the electrical load as an electronic switch in the switch mode as described above. When operating in the fault mode, the control circuit may be configured to change back to the normal mode, for example, if the magnitude of the voltage $V_{CS}$ at the control terminal is greater than a second predetermined threshold $V_{TH2}$ (e.g., approximately 1000 mV).

What is claimed is:

1. A method for controlling an amount of power delivered from a power source to an electrical load, the method comprising:
   receiving a feedback signal indicating a magnitude of a control signal generated by a communication circuit and provided to a load regulation circuit for controlling the amount of power delivered to the electrical load;
   determining a difference between the magnitude of the control signal and a desired magnitude, the desired magnitude indicating a target amount of power to be delivered to the electrical load;
   generating an output signal based on the difference between the magnitude of the control signal and the desired magnitude to adjust the magnitude of the control signal towards the desired magnitude; and
   providing the output signal to the communication circuit, wherein the communication circuit comprises a current sink circuit configured to receive a link supply voltage from the load regulation circuit and sink current through the load regulation circuit so as to control the magnitude of the control signal towards the desired magnitude based on the output signal, and wherein the load regulation circuit is configured to control the amount of power delivered to the electrical load towards the target amount based on the control signal.

2. The method of claim 1, further comprising rendering a controllably conductive device conductive and non-conductive to turn the electrical load on and off, respectively, the controllably conductive device adapted to be coupled in series electrical connection between the power source and the load regulation circuit.

3. The method of claim 2, wherein the output signal is generated via a digital-to-analog converter (DAC).

4. The method of claim 3, further comprising overriding adjustment of the magnitude of the output signal in response to the difference between the magnitude of the control signal and the desired magnitude and feeding a predetermined value into the DAC for a period of time when turning on the electrical load.

5. The method of claim 4, wherein the electrical load comprises a light-emitting diode (LED) light source, and the predetermined value corresponds to a low-end intensity of the LED light source.

6. The method of claim 5, further comprising measuring an input value of the DAC when an intensity of the LED light source is at the low-end intensity and storing the input value of the DAC in memory as the predetermined value for use when turning on the LED light source.

7. The method of claim 4, wherein, when turning on the electrical load, the predetermined value is fed into the DAC until the load regulation circuit has started to generate the link supply voltage.

8. The method of claim 1, wherein the communication circuit comprises a 0-10V communication circuit and wherein the control signal comprises a 0-10V control signal generated by the 0-10V communication circuit.

9. The method of claim 8, wherein the electrical load comprises a light-emitting diode (LED) light source and wherein the desired magnitude of the control signal is determined as a linear function or a non-linear function of a desired intensity of the LED light source.

10. The method of claim 9, further comprising receiving an input and determining whether to use the linear function or the non-linear function to determine the desired magnitude of the control signal based on the input.

11. The method of claim 1, wherein the electrical load comprises a light-emitting diode (LED) light source and wherein the method further comprises determining a dimming curve model for the load regulation circuit and the LED light source based on a detected ambient light level.

12. The method of claim 11, wherein the dimming curve model is determined by:
adjusting the magnitude of the output signal through a plurality of values;
determining a light level of the LED light source at each of the plurality of values of the output signal; and
correlating the light levels and the plurality of values of the output signal to determine the dimming curve model.

13. The method of claim 12, wherein the dimming curve model is determined by:
determining an ambient light level when the electrical load is off;
subtracting the ambient light level from the light level corresponding to each of the plurality of values of the output signal to determine an intensity level of the LED light source at each of the plurality of values of the output signal; and
correlating the intensity levels of the LED light source and the plurality of values of the output signal to determine the dimming curve model.

14. The method of claim 13, wherein the dimming curve model is determined by:
receiving a feedback from a daylight sensor;
subtracting the feedback from the intensity level at each of the plurality of values of the output signal to determine a refined intensity level of the LED light source at each of the plurality of values of the output signal; and
correlating the refined intensity levels of the electrical load and the plurality of values of the output signal to determine the dimming curve model.

15. The method of claim 11, further comprising detecting flickering of the LED light source, and increasing the magnitude of the output signal in response to detecting the flickering of the LED light source.

16. The method of claim 1, further comprising determining that the link supply voltage is not generated by the load regulation circuit and providing an indication that a faulty condition exists.

17. A method for controlling an amount of power delivered to a lighting load, the method comprising:
generating an output signal for controlling a magnitude of a control signal provided to a load regulation circuit for controlling the amount of power delivered to the lighting load, the control signal generated by a communication circuit that comprises a current sink circuit configured to sink current through the load regulation circuit to generate the control signal;
adjusting the magnitude of the output signal through a plurality of values;
determining an intensity level of the lighting load corresponding to each of the plurality of values of the output signal; and
determining a dimming curve model for the load regulation circuit and the lighting load based on a correlation of the determined intensity levels of the lighting load and the plurality of values of the output signal.

18. The method of claim 17, wherein the intensity level of the lighting load corresponding to each of the plurality of values of the output signal is determined by:
determining an ambient light level when the lighting load is off;
receiving an indication of a measured intensity level of the lighting load at each of the plurality of values of the output signal; and
subtracting the ambient light level from the measured intensity level at each of the plurality of values of the output signal to derive the intensity level of the lighting load at each of the plurality of values of the output signal.

19. The method of claim 18, wherein at least one of the ambient light level or the measured intensity level of the lighting load at each of the plurality of values of the output signal is provided by a photodetector.

20. The method of claim 17, wherein the intensity level of the lighting load corresponding to each of the plurality of values of the output signal is determined by:
receiving a feedback from a daylight sensor; and
subtracting the feedback from a measured intensity level of the lighting load at each of the plurality of values of the output signal to derive the intensity level of the lighting load at each of the plurality of values of the output signal.

\* \* \* \* \*